United States Patent [19]

Tsurumi et al.

[11] Patent Number: 5,350,727
[45] Date of Patent: Sep. 27, 1994

[54] PROCESS OF PREPARING CATALYST SUPPORTING HIGHLY DISPERSED PLATINUM PARTICLES

[75] Inventors: Kazunori Tsurumi, Kanagawa, Japan; Paul Stonehart, Madison, Conn.

[73] Assignees: Tanaka Kikinzoku Kogyo K.K., Japan; Stonehart Associates Inc., Madison, Conn.

[21] Appl. No.: 88,082

[22] Filed: Jul. 6, 1993

[30] Foreign Application Priority Data

Jul. 6, 1992 [JP] Japan .................................. 4-202003

[51] Int. Cl.$^5$ ............................................. B01J 23/42
[52] U.S. Cl. .................................... 502/325; 502/185; 423/22
[58] Field of Search ................... 502/325, 185; 423/22

[56] References Cited

U.S. PATENT DOCUMENTS

| | | | |
|---|---|---|---|
| 3,953,369 | 4/1976 | Ohara et al. | 502/333 |
| 3,992,512 | 11/1976 | Petrow et al. | 423/512 R |
| 4,136,059 | 1/1979 | Jalan et al. | 502/101 |
| 4,221,678 | 9/1980 | Ishikawa et al. | 502/332 |

Primary Examiner—Asok Pal
Assistant Examiner—P. Achutamurthy
Attorney, Agent, or Firm—Klauber & Jackson

[57] ABSTRACT

Disclosed herein is a process of preparing a catalyst having narrow particle size distribution and supported with monodispersed platinum particles of which a particle size is about less than 20 Å. In the present invention, allyl alcohol and hydrazinc hydrate are employed in place of a sulfur-containing agent for supporting the platinum particles on a support thereby avoiding the contamination of the sulfur component and the high temperature treatment for decomposing the sulfur-containing agent. Accordingly, the resulting catalyst contains no sulfur contaminant and substantially no agglomerated platinum particles.

1 Claim, 1 Drawing Sheet

PROCESS OF PREPARING CATALYST SUPPORTING HIGHLY DISPERSED PLATINUM PARTICLES

BACKGROUND OF THE INVENTION

The present invention relates to a process of preparing a catalyst which supports highly dispersed metal particles utilized in the field of catalysts.

Catalysts which support metals are widely utilized in various chemical reactions. Especially in the case of utilizing such an expensive catalyst as a precious metal, in order to effectively utilize the catalytically active metal, the particle diameter of the metal particles are required to be reduced as much as possible and to be uniformly supported on a support. Many attempts have been made especially for supporting metal particles having the minimum diameters on a support.

As disclosed in U.S. Pat. No. 3,992,512 and U.S. Pat. No. 4,136,059, as a method of supporting metal particles having a diameter of below 20 Å on a support, a method has been proposed which comprises reacting such a sulfur-containing compound as sodium sulfite and sodium dithionate and chloroplatinic acid, supporting resulting colloid-Like platinic acid complex compound containing the sulfur, and oxidatively treating it with such an oxidant as hydrogen peroxide to obtain the support supported with fine platinum particles. The method is effective as far as the supporting of the platinum particles is concerned.

In the platinum-supported catalyst obtained through the conventional process, liberated colloid-like sulfur and a sulfate formed by the reaction of the above compound are contained. The liberated sulfur which is a well-known catalytic poison against platinum strongly bonds the platinum to lower the catalytic performance. The sulfate is non-volatile so that its removal should be conducted by water-washing. The sulfate remained produces several inconveniences on the employment of the catalyst such as the existence as impurities and an undesired reaction with the support. Although the liberated sulfur remained can be removed by thermal treatment in a hydrogen flow or in an oxidative flow, the heating may create the increase of the particle diameter by means of the agglomeration of the metal particles so that the desired particles cannot be obtained.

SUMMARY OF THE INVENTION

An object of the present invention is to provide a process of preparing a catalyst which supports monodispersed platinum particles.

Another object of the invention is to provide a process of preparing a catalyst having narrow particle size distribution and a particle diameter of less than about 20 Å.

A further object of the present invention is to provide a process of preparing a catalyst having highly dispersed platinum particles without employing a sulfur-containing agent.

The present invention has been made to overcome the above problems. The catalyst supporting monodispersed platinum particles which has the narrow particle size distribution and of which a particle diameter is less than about 20 Å can be obtained by adding a support, which supports platinum particles formed by reduction of a platinum-containing ion, to a platinum-containing solution, obtained by dissolving dinitrodiamine platinum in nitric acid under heating, adding thereto allyl alcohol and hydrazinc hydrate to support on the support a reaction product of the platinum-containing ion, the allyl alcohol and the hydrazinc hydrate and thermally treating the support in a reduction gas containing a hydrogen gas to reduce the reaction product to the platinum particles.

In the present invention, allyl alcohol and hydrazinc hydrate are employed in place of a sulfur-containing agent for supporting the platinum particles on a support thereby avoiding the contamination of the sulfur component and the high temperature treatment for decomposing the sulfur-containing agent. Accordingly, the resulting catalyst contains no sulfur contaminant and substantially no agglomerated platinum particles.

Therefore, in accordance with the present invention, a highly dispersed platinum-supported catalyst having a clean and active surface and the platinum particles of which a particle size is about less than 20 Å can be obtained. Further, the platinum content of the resulting catalyst may reach nearly to 10% in weight which is a target value of the platinum-supported catalyst.

DETAILED DESCRIPTION OF THE INVENTION

Figure 1:
FIG. 1 is a microphotograph of 1,000,000 magnifications of the platinum-supported carbon black catalyst obtained in Example 1 observed with a transmission electronic microscope.

The reason why the allyl alcohol and the hydrazinc hydrate are added to nitric acid solution of the. dinitrodiamine platinum is that platinum-containing colloid is formed which is then supported on the support. If the allyl alcohol is added and then the hydrazinc hydrate is added to the platinum solution prepared by dissolving the crystal of the dinitrodiamine platinum in the nitric acid without the addition of the catalyst support material, yellowish brown colloid-like particles are formed. The platinum containing rate of the particles in this case is about 60% in weight upon analysis. These particles are not platinum metal colloid and are considered to be a compound of the dinitrodiamine platinum, the allyl alcohol and the hydrazinc hydrate though its structure is unknown. For this reason, the initial addition of the allyl alcohol and the hydrazinc hydrate to the nitric acid solution of the dinitrodiamine platinum containing the support material enables to finely support the above compound on the support, and by thermally treating it in a hydron-containing flow, a catalyst which supports highly monodispersed platinum particles of which a particle diameter is less than about 20 Å can be obtained.

As a support of the present invention, any material which is stable in a reduction atmosphere and in a reaction condition in which the resulting catalyst is employed can be utilized. The most desirable support material is carbon black.

Most parts of the allyl alcohol and the hydrazinc hydrate employed in the invention may removed by evaporation in the thermal treatment in the hydrogen-containing flow. Even if a small amount thereof remains, these do not contain any substance which acts as a catalytic poison so that the lowering of the catalytic performance is never expected.

EXAMPLES

Although examples of the invention will be described, these Examples are not construed to restrict the scope of the invention.

Example 1

After 8 g of dinitrodiamine platinum crystal was dissolved in 150 ml of nitric acid of 8 normal under heating, the solution was concentrated to 100 ml under further heating. The platinum content of this platinum solution was measured to be 4.569% in weight. After 10.493 g of this platinum solution was diluted in 300 ml of water, 4.5 g of acetylene carbon black was added thereto and well dispersed with an ultrasonic homogenizer. After 3.8 ml of allyl alcohol was added thereto followed by sufficient stirring, a solution prepared by dissolving 0.814 g of hydrazinc hydrate in 10 ml of water was added thereto all at once followed by 30 minutes' stirring. This suspension was further stirred for two hours in a hot water bath of 50° C. so that the platinum-containing compound was completely supported on the carbon black. After the suspension containing the carbon black supporting the platinum-containing compound was littered, the filtered solid was washed with 0.5 liter of pure water and dried at 60° C. for six hours. The carbon black supporting the platinum-containing compound thus obtained was thermally treated in a hydrogen-nitrogen mixed flow containing 10% of hydrogen at 250° C. for 30 minutes to obtain a platinum-supported carbon black catalyst.

The measurement of the platinum content, the measurement of a specific surface area of the platinum and the observation of the state of the platinum particle dispersion by means of a transmission electronic microscope were conducted. As a result, the platinum content was 9.14% in weight. The specific surface area of the platinum was 163 m²/g which corresponds to a platinum particle having a diameter of 17.2 Å when converted into a spherical particle. A microphotograph of 1,000,000 magnifications taken with a transmission electronic microscope is shown in FIG. 1 which clarifies that the platinum particles of 10 to 20 Å are supported on the carbon black support under the monodispersed state.

Comparative Example 1

After 3.326 g of a chloroplatinic acid solution (platinum content: 15.031% in weight) was diluted with 300 ml of water and was heated to 60° C., 6 ml of aqueous hydrogen peroxide of 28% in weight was added thereto. After 34 ml of sodium dithionate of 60 g/liter was gradually added to the above solution for 15 minutes, a suspended solution which had been prepared by suspending 4.5 g of acetylene carbon black in 300 ml of water was added to and mixed with the above platinum-containing solution. After one hour stirring, the suspended solution was filtered. After the remaining solid was washed with 0.5 liter of pure water, it was dried for 6 hours at 70° C. to obtain a platinum-supported carbon black catalyst.

The measurement of the platinum content, the measurement of a specific surface area of the platinum and the observation of the state of the platinum particle dispersion by means of a transmission electronic microscope were conducted. As a result, the platinum containing rate was 9.6% in weight. The specific surface area of the platinum was 16 m²/g which corresponds to a platinum particle having a diameter of 175 Å when converted into a spherical particle. In accordance with the observation with transmission electronic microscope of 1,000,000 magnifications, the particles of 10 to 20 Å were observed to be uniformly supported on the carbon black support, which was different from the result of the platinum surface area measured in accordance with the carbon monoxide adsorption.

Comparative Example 2

Removal of the sulfur component in the platinum-supported carbon black catalyst obtained in Comparative Example 1 was attempted by means of thermal treatment.

At first, the sulfur content was measured by means of fluorescence X-rays. After this catalyst was treated in a hydrogen-nitrogen mixed flow of which hydrogen concentration was 50% for one hour at 250° C., the sulfur analysis, the measurement of a specific surface area of the platinum in accordance with the carbon monoxide adsorption and the observation with a transmission electronic microscope were conducted.

Then, the catalyst after the above treatment with the hydrogen at 250° C. for one hour was further treated in a hydrogen-nitrogen mixed flow of which hydrogen concentration was 50% for two hours at 350° C., and the sulfur analysis, the measurement of a specific surface area of the platinum in accordance with the carbon monoxide adsorption and the observation with a transmission electronic microscope were conducted for the second time. The results are shown in Table.

As apparent from Table 1, the sulfur component still remained even after the treatment in the hydrogen mixed flow at 250° C. for one hour + at 350° C. for two hours. Due to the contamination of the platinum surface with the sulfur, the platinum specific surface areas measured by means of the carbon monoxide adsorption are not in agreement with the particle sizes obtained through the observation with the transmission electronic microscope. This means the occurrence of the catalytic poisoning which lowered the catalytic activities.

TABLE 1

| $H_2$—$N_2$ Mixed Flow Treatment | Sulfur content (% in weight) | Pt Specific Surface Area by CO Adsorption (Converted Particle) | Particle Diameter Observed with Transmission Electronic Microscope |
|---|---|---|---|
| No Treatment | 3.6 | 16 m²/g (175 Å) | 10 to 20 Å |
| 250° C., 1 hr | 1.4 | 34 m²/g (82 Å) | 20 to 25 Å |
| 250° C., 1 hr + 350° C., 2 hr | 0.8 | 63 m²/g (45 Å) | 25 to 35 Å (*) |

Figure 2:
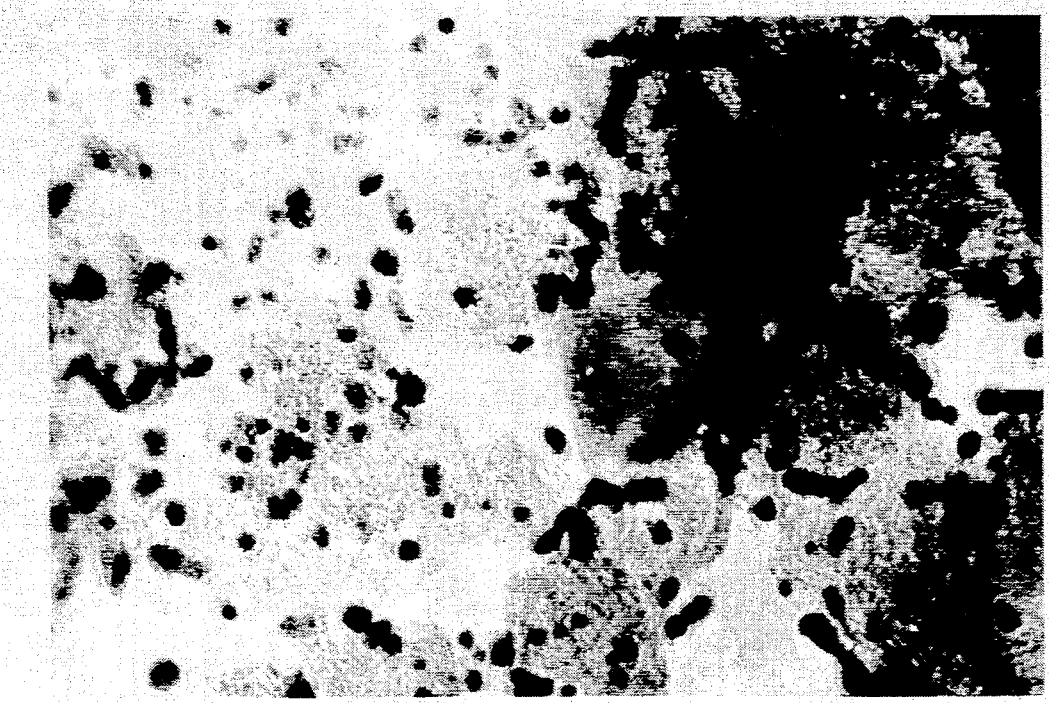
FIG. 2 is a microphotograph of 1,000,000 magnifications of the catalyst in Comparative Example 2 which was obtained by treating the platinum-supported carbon black catalyst obtained in Comparative Example 1 in the hydrogen mixed flow at 250° C. for one hour + at 350° C. for two hours observed with a transmission electronic microscope.

(*) Remarks: Four or five Pt particles having a particle diameter of 25 to 35 Å were agglomerated and were not monodispersed (FIG. 2).

When such an operation of removing the sulfur component to a certain degree was conducted, the increase of the platinum particle size and the association of the particles were observed so that a monodispersed platinum particle-supported catalyst having a clean and active surface and the platinum particles of which a particle size was about less than 20 Å could not be obtained.

What is claimed is:

1. A process of preparing a catalyst, which comprises highly dispersed platinum particles, said process comprising the steps of:
   a. preparing a platinum containing solution by dissolving dinitrodiamine platinum in nitric acid;
   b. adding a supporting material for said platinum particles, in the catalyst, to the platinum containing solution;
   c. adding allyl alcohol and hydrazine hydrate to the platinum containing solutions; wherein a platinum containing reaction product of the dissolved dinitroamine platinum, the allyl alcohol and the hydrazine hydrate is deposited on said supporting material; and
   c. thermally treating the supporting material in a hydrogen-containing reduction gas, to reduce the reaction product to the platinum particles.

* * * * *